United States Patent [19]

Azumi et al.

[11] Patent Number: 4,557,567
[45] Date of Patent: Dec. 10, 1985

[54] LENS SYSTEM WITH PLASTIC LENSES COMPENSATING FOR TEMPERATURE CHANGES

[75] Inventors: Takashi Azumi, Katsuta; Takesuke Maruyama; Takanori Hisada, both of Yokohama, all of Japan

[73] Assignee: Hitachi, Ltd., Tokyo, Japan

[21] Appl. No.: 455,803

[22] Filed: Jan. 5, 1983

[30] Foreign Application Priority Data

Jan. 11, 1982 [JP] Japan .................................. 57-1727

[51] Int. Cl.⁴ .................................................. G02B 7/04
[52] U.S. Cl. .................................. 350/427; 350/475; 350/469
[58] Field of Search ...................... 350/475, 476, 469

[56] References Cited

U.S. PATENT DOCUMENTS 3,912,379 10/1975 DeJager ............................. 350/475

Primary Examiner—John K. Corbin
Assistant Examiner—Paul M. Dzierzynski
Attorney, Agent, or Firm—Antonelli, Terry & Wands

[57] ABSTRACT

In a zoom lens system with plastic lenses, shifting of an image forming plane of the zoom lens caused by resultant deformation and optical characteristic changes due to temperature changes of plastic single lenses and of plastic lenses included in compound lenses in the zoom lens system is corrected by a compound lens of a plastic lens and a glass lens cemented together or by a compound lens of a plastic lens and a glass lens spaced apart from each other with a slight air gap between opposing surfaces thereof of substantially the same radius of curvature, the compound lens having a temperature change dependent shifting of image forming plane to correct that of other plastic lenses.

9 Claims, 15 Drawing Figures

LENS SYSTEM WITH PLASTIC LENSES COMPENSATING FOR TEMPERATURE CHANGES

BACKGROUND OF THE INVENTION

This invention relates to a lens system with plastic lenses and more particularly to a zoom lens which can optically correct shifting of an image forming plane caused by deformation and optical characteristic changes of plastic lenses due to temperature changes.

With a view of reducing weight and cost of optical lenses, plastic lenses have currently been put into practice. Mainly used as materials of the plastic lenses are polymers such as methylmetaacrylate or styrene (methylmetaacrylate polymer and styrene polymer are respectively abbreviated as acryl and styrene hereinafter) and copolymers. These materials, however, have optical constants having larger dependency upon temperature changes than those of glass materials. More particularly, in these plastic lens materials, the temperature dependent change rate of refractive index is about $10^{-4}/°C$. which is about 100 times as large as that of glass material and the temperature dependent change rate of coefficient of linear expansion is about $10^{-4}/°C$. which is about 10 times as large as that of glass material. Therefore, the focal length of each plastic lens constituting an optical lens system varies with changes in temperature more greatly than that of glass lenses does, with the result that the position of an image forming plane mainly shifts and an image is degraded. On the other hand, the allowable amount of shifting of the image forming plane due to temperature changes is determined depending on the depth of focus. For example, since a video camera with a $\frac{2}{3}''$ imaging device has an allowable lateral aberration of about 40 μm, an F-number (hereinafter referred to as "F") 5 lens provides a depth of focus of about 200 μm corresponding to the 40 μm lateral aberration. An F=1.4 lens of larger aperture, however, provides only a depth of focus of about 50 μm corresponding to the 40 μm lateral aberration. Incidentally, a prior art lens system simply substituting plastic lenses for glass lenses suffers from shifting of an image forming plane which amounts to 300 to 500 μm under the influence of a temperature change of 30° C. in practical use. This means that only the depth of focus provided by a lens of the order of F=10 can fall within the allowable range of 40 μm lateral aberration. Under the circumstances, design for large-aperture plastic lenses must take into consideration and solve the problem of shifting of the image forming plane due to temperature changes.

The temperature dependent shifting of the image forming plane in a plastic lens will now be described in greater detail. Where a plastic single lens has an amount of temperature dependent change of refractive index represented by α, an amount of temperature dependent change of coefficient of linear expansion represented by β, a refractive index of N, a radius of curvature of R at front and back surfaces, a focal length of f, and an amount of temperature dependent change of focal length represented by Δf corresponding to a change of temperature ΔT, the following relation stands:

$$-\Delta f/f = \frac{\alpha}{N-1} \cdot \Delta T - \beta \cdot \Delta T$$

where $$f = \frac{1}{2(N-1)} R.$$

Assuming that $-\Delta f/f$ (temperature change dependent variance of focal length) is $V_T$ at $\Delta T = 30°$ C., a lens system undergoes shifting of the image forming plane by Ath which is expressed as, $$Ath = f^2 \Sigma h_i^2/(f_i \cdot V_{Ti}) \tag{1}$$

where $h_i$, $f_i$ and $V_{Ti}$ respectively represent a height of a pheripheral light beam, a focal length and a value of $V_T$ related to an i-th single lens. To eliminate the temperature dependent shifting of the image forming plane, Ath=0 must be satisfied in connection with equation (1).

However, the focal length of radius of curvature of a single plastic lens or each of the plastic lens bonded together is constrained by optical design and for this reason, it was difficult to satisfy Ath=0 in equation (1) by adjusting the focal length or radius of curvature of each plastic lens for the sake of correcting shifting of the image forming plane caused by deformation and optical characteristic changes of plastic lenses due to temperature changes.

SUMMARY OF THE INVENTION

An object of this invention is to provide a lens system with plastic lenses capable of correcting to a sufficiently small value shifting of the image forming plane caused by deformation and optical characteristic changes of the plastic lenses due to temperature changes within a practical ambient temperature range.

Another object of this invention is to provide a lens system with plastic lenses which can be free from degradation of aberrations attributable to correction of shifting of the image forming plane due to temperature changes.

To accomplish the above objects, preferably according to the invention, a compound lens of a plastic lens and a glass lens is used in a lens system including plastic lenses, and one lens of the compound lens has a second surface of substantially the same radius of curvature as that of a first surface of the other following lens. In other words, by suitably adjusting power proportion between the two lenses of the compound lens, the amount of temperature dependent change of power of the compound lens per se can be set, without substantial influence upon optical design of the entire lens system, to a value that can correct shifting of the image forming plane caused by deformation and optical characteristic changes of the remaining plastic lenses due to temperature changes so as to eliminate degradation of an image due to shifting of the image forming plane of the system in practical use.

DESCRIPTION OF THE PREFERRED EMBODIMENTS

Figure 1:
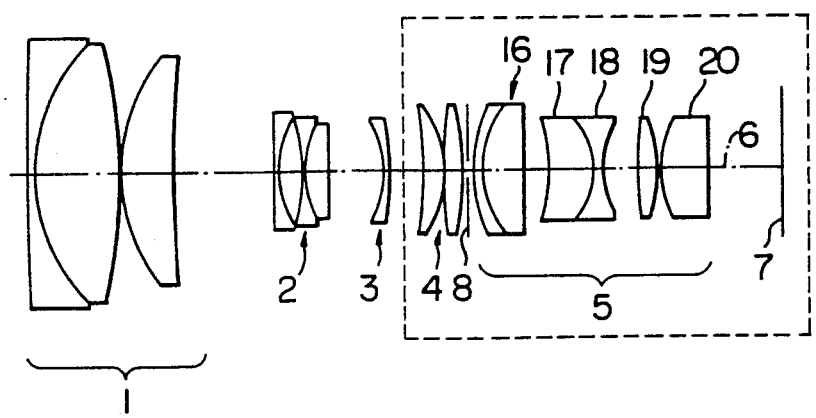
FIG. 1 shows a construction of a zoom lens embodying the invention.
Figure 2:
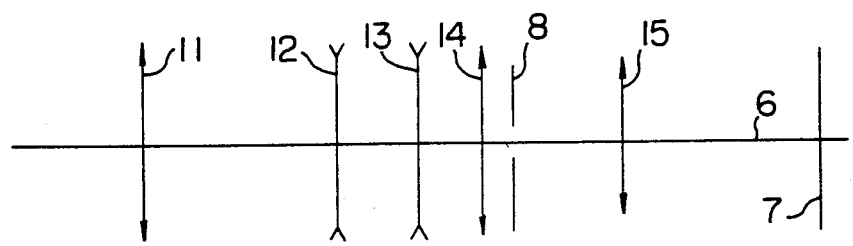
FIG. 2 is a diagrammatic representation showing a power map in the zoom lens shown in FIG. 1.

Referring to FIGS. 1 and 2, a preferred embodiment of the invention will be described. An arrangement of lenses illustrated in FIG. 1 is a zoom lens for a video camera of F=1.4, f=12 to 48 mm or 4 times magnification. FIG. 2 shows a magnifying power map in the zoom lens. The zoom lens comprises a front lens group 1 of a positive power 11, a variator lens group 2 of a negative power 12 movable along an optical axis 6 upon zooming, a movable compensator lens 3 of a negative power 13 movable along the optical axis 6 upon zooming, a stationary compensator lens group 4 of a positive power 14, and a master lens group 5 of a positive power 15 comprised of lenses 16, 17, 18, 19 and 20. Reference numeral 7 designates an image forming plane and 8 an aperture.

Figure 3A:
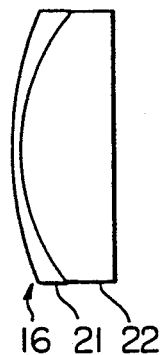
FIGS. 3A and 3B are sectional views showing examples of a compound lens of a plastic lens and a glass lens used in the embodiment of FIG. 1.

Correction of shifting of the image forming plane caused by deformation and optical characteristic changes of plastic lenses due to temperature changes will be described by referring to the zoom lens shown in FIG. 1. For better understanding of principle of the present invention, the manner of correcting shifting of the image forming plane caused by temperature change dependent deformation and characteristic changes of plastic lenses in a so-called relay lens system comprising the lens groups 4 and 5 enclosed by a dotted line in FIG. 1 will first be described. In FIG. 1, the lenses 4, 19 and 20 are made of acryl, the lens 18 is made of styrene and the lens 17 is made of glass. It is then assumed that shifting of an image forming plane in the relay lens system caused by temperature change dependent deformation and optical characteristic changes of the plastic lenses 4, 18, 19 and 20 is corrected by shifting of an image forming plane of the lens 16. As shown in FIG. 3A, the lens 16 is a compound lens of an acryl lens 21 and a glass lens 22. A second or back surface of the acryl lens 21 and a first or front surface of the following glass lens 22 have the same radius of curvature and they are cemented or bonded together.

Table 1 lists focal lengths of the lenses 4, 16, 17, 18, 19 and 20 and heights of light beams incident to the respective lenses when a height of a light beam incident to the master lens 16 is normalized to 1 (one), in the zoom lens shown in FIG. 1. Table 2 lists temperature dependent change rates of refractive index and coefficient of linear expansion, the aforementioned temperature change dependent variance (hereinafter simply referred to as temperature variance) and the refractive index of acryl and styrene.

TABLE 1

| Compensator lens | 4 | $f_4 = 29.000$ | $h_4 = 1.000$ |
|---|---|---|---|
| Master lenses | 16 | $f_{16} = 30.220$ | $h_{16} = 1.000$ |
| | 17 | $f_{17} = 29.367$ | $h_{17} = 0.617$ |
| | 18 | $f_{18} = -11.121$ | $h_{18} = 0.702$ |
| | 19 | $f_{19} = 43.574$ | $h_{19} = 0.744$ |

TABLE 1-continued

| | 20 | $f_{20} = 33.154$ | $h_{20} = 0.748$ |
|---|---|---|---|
| Focal length of master lens system | | | $f = 32.000$ |

TABLE 2

| Acryl: | temperature dependent change rate of refractive index | $\alpha_a = -1.8 \times 10^{-4}/°C$ |
|---|---|---|
| | temperature dependent change rate of coefficient of linear expansion | $\beta_a = 6.0 \times 10^{-5}/°C$ |
| | temperature variance | $V_{Ta} = -117.77$ |
| | refractive index | $N_a = 1.4932$ |
| Styrene: | temperature dependent change rate of refractive index | $\alpha_s = -1.37 \times 10^{-4}/°C$ |
| | temperature dependent change rate of coefficient of linear expansion | $\beta_s = 8.0 \times 10^{-5}/°C$ |
| | temperature variance | $V_{Ts} = -104.00$ |
| | refractive index | $N_s = 1.5904$ |

From equation (1) which prescribes the condition for temperature correction and Tables 1 and 2, the shifting Ath' of the image forming plane due to deformation and optical characteristic changes of the plastic lenses other than the lens 16 caused by a temperature changes of 30° C. can be determined as follows:

$$A_{th}' = f^2\{h_4^2/(f_4 \cdot V_{Ta}) + h_{18}^2/(f_{18} \cdot V_{Ts}) +$$

$$h_{19}^2/(f_{19} \cdot V_{Ta}) + h_{20}^2/(f_{20} \cdot V_{Ta})\} = -0.129.$$

On the other hand, in order to correct the above shifting Ath', an equivalent temperature variance $V_{T16}$ of the lens 16 comprised of the acryl lens 21 and the glass lens 22 cemented together as shown in FIG. 3A, and focal lengths $f_{16a}$ and $f_{16G}$ of the acryl and glass lenses 21 and 22 are expressed as, $$V_{T16} = f^2/\{f_{16} \cdot (-A_{th}')\} = 262.67$$

$$f_{16a} = f_{16} \cdot V_{Ta}/V_{T16} = -67.19$$

$$f_{16G} = \frac{f_{16} \cdot f_{16a}}{f_{16a} - f_{16}} = 20.84.$$

Therefore, it is possible to determine the equivalent temperature variance $V_{T16}$ without changing the focal length $f_{16}$ of the lens 16 so that the shifting of the image forming plane caused by the temperature change of 30° C. can be determined by the acryl lens 21 to $-A_{th}'$ which cancels out or corrects the shifting Ath' of the image forming plane due to temperature change dependent deformation, etc. of the remaining plastic lenses. Then, the focal lengths $f_{16a}$ and $f_{16G}$ of the acryl lens 21 and glass lens 22 can be determined from the $V_{T16}$ so as to determine power proportion of both the lenses.

It will be seen from the foregoing that the compound lens described thus far can correct the shifting of the image forming plane caused by temperature changes, but various aberrations of the lens should be discussed. Some aberrations of a lens are in cubic proportion to the difference between refractive indices at front and back surfaces of the lens.

Figure 4:
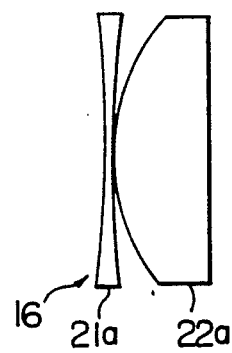
FIG. 4 is a sectional view showing another compound lens of a plastic lens and a glass lens for comparison with the compound lenses in FIGS. 3A and 3B.
Figure 5:
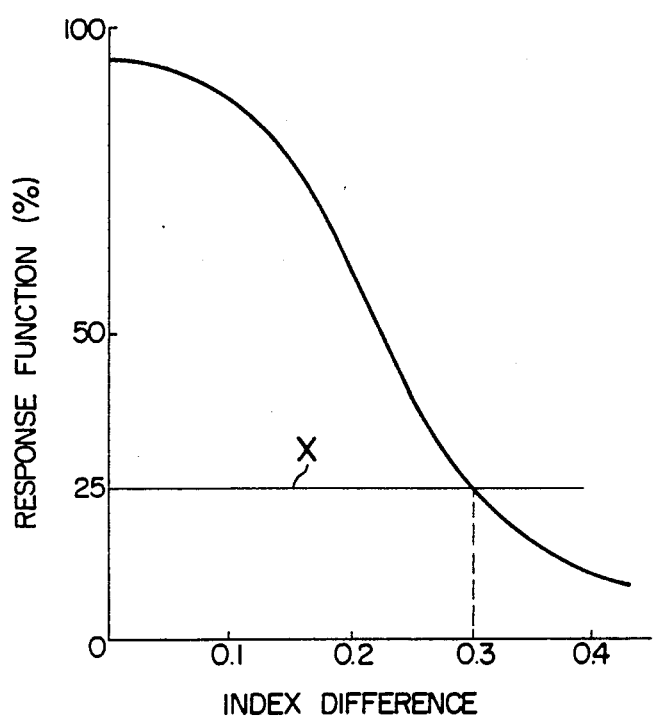
FIG. 5 is a graphic representation for explaining an influence on aberrations by the compound lenses shown in FIGS. 3A, 3B and 4.
Figure 6B:
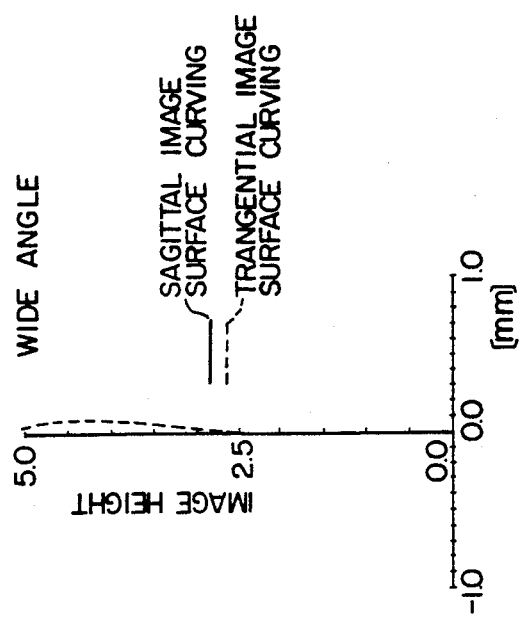
FIGS. 6A, 6B, 7A, 7B, 8A and 8B are graphic representations showing various performances obtained by the embodiment of FIG. 1.
Figure 6A:
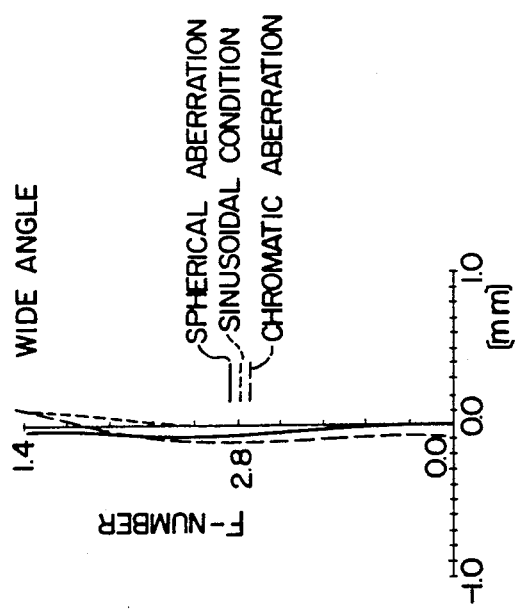
Figure 7A:
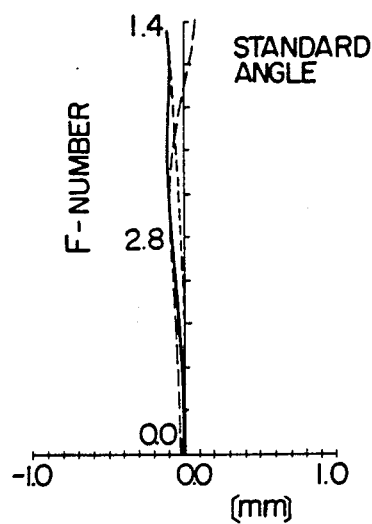
Figure 7B:
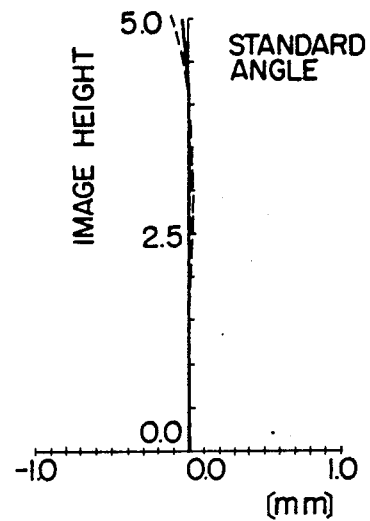
Figure 8A:
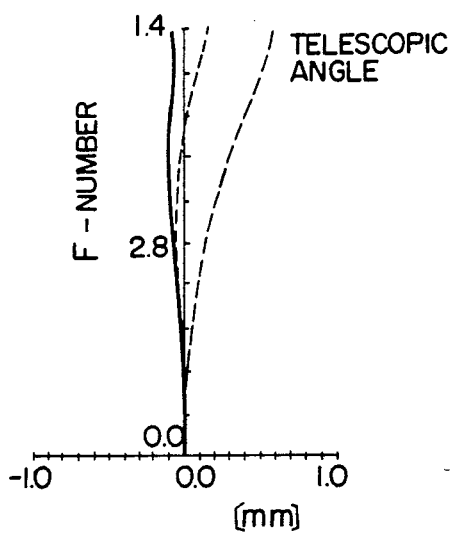
Figure 8B:
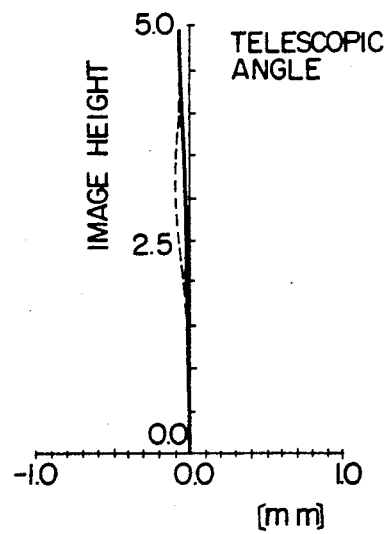

The refractive index of acryl is approximately 1.49 and that of glass is within the range of 1.4 to 1.85. Considering that an acryl lens 21a and a glass lens 22a are not cemented together, but each act as a single lens as shown in FIG. 4, such a compound lens 16 has an aberration of $0.5^3a$ (where a is a proportional constant), since the difference between the refractive indices of air and acryl becomes approximately 0.5. On the other hand, considering that the acryl lens 21 and the glass lens 22 are cemented together to form a combination lens 16 as shown in FIG. 3A, the compound lens 16 has an aberration of $(0.31)^3 a$, i.e., approximately $(0.3)^3 a$, since the difference between the refractive indices of acryl and glass becomes approximately 0.3. The aberration of the compound lens thus constructed is reduced by approximately ¼ as compared with that of the combination of single lenses shown in FIG. 4. The smaller the refractive index of the glass lens, i.e., the refractive index difference between the acryl and glass lenses, is, the smaller the amount of aberration becomes. The relationship therebetween will be seen from FIG. 5 which is a graphic representation for explaining an influence on aberrations by the refractive index difference a compound lens. In FIG. 5, an abscissa represents the difference between the refractive indices of lenses, while an ordinate represents a response function of the zoom lens in FIG. 1, which is dependent on the aberrations caused by the lenses. Therefore, the compound lens of the plastic lens and the glass lens cemented together as shown in FIG. 3A meets not only the temperature variance $V_T$ for correction of the temperature change dependent shifting but also the reduction of aberrations. As the difference between refractive indices of the plastic lens and glass lens cemented together is small, so the reduction of aberration is enhanced.

In the embodiment of the present invention, it is necessary to select the refractive index difference of the compound lens to an absolute value smaller than approximately 0.3, because the response function of the zoom lens system cannot have a value below a line X in FIG. 5 in order to prevent the degradation of lens resolution. Since other lens systems according to the present invention show a characteristic curve similar to FIG. 5, the refractive index difference smaller than approximately 0.3 is necessary in the present invention.

Figure 3B:
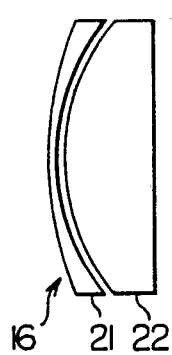

Provided that a second surface (image side) of an acryl lens has substantially the same radius of curvature as that of a first surface (object side) of a glass lens so that the difference between heights of light beams passing through the first and second surfaces can be sufficiently smaller than a light of a light beam coming from the second or back surface of the acryl lens, a compound lens of the acryl lens and the glass lens separated from each other as shown in FIG. 3B can cancel out aberration since a possible aberration due to the separation can be corrected by the first and second surfaces, and the compound lens of FIG. 3B may be considered equivalent to the combination lens of FIG. 3A.

Further, when in the simple compound lens of FIG. 4 the acryl lens 21a has a negative power, a height of a peripheral beam incident to the glass lens 22a becomes larger than that of the combination lens of FIG. 3A or 3B, resulting in an increased spherical aberration. In this respect, the compound lens of the plastic lens and the glass lens bonded together are slightly separated from each other is superior to the simple combination lens of FIG. 4.

When the compound lens 16 of FIG. 3A or 3B is incorporated into the zoom lens of FIG. 1, aberration characteristics as shown in FIGS. 6A, 6B, 7A, 7B, 8A and 8B can be obtained, and the temperature change dependent shifting of the image forming plane of the whole system can be reduced to 5.0 μm. This value is allowable from the standpoint of the depth of focus in the F=1.4 lens of the ⅔" image device for video camera.

Although in FIG. 1 the combination lens 16 is arranged in the master lens group for correcting the temperature change dependent shifting of the relay lens system, a compound lens may similarly be arranged in a lens group other than the master lens group of the zoom lens system in order to correct shifting of the image forming plane caused by deformation of plastic lenses within the lens group due to temperature changes.

Figure 9:
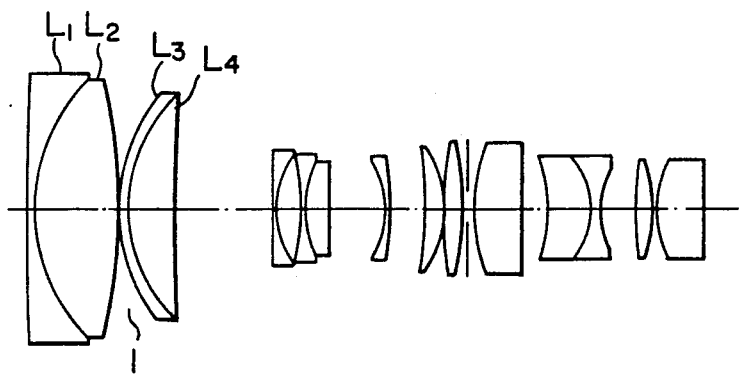
FIGS. 9, 10 and 11 respectively show lens arrangements according to other embodiments of the invention.

In another embodiment of the invention as shown in FIG. 9, a compound lens of an acryl lens $L_3$ and a glass lens $L_4$ cemented together which is arranged in a front lens group 1 takes advantage of its $V_T$ to correct shifting of an image forming plane due to temperature change dependent deformation of a styrene lens $L_1$ and an acryl lens $L_2$ in the same lens group.

Figure 10:
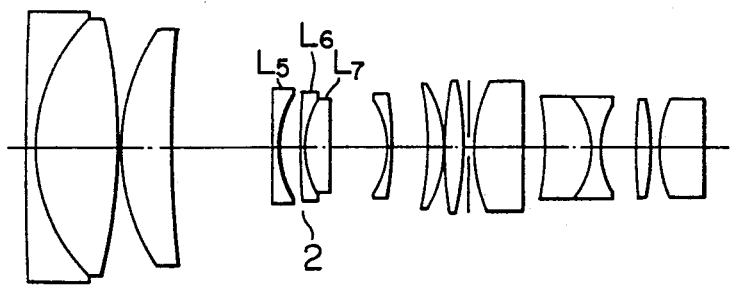

FIG. 10 shows still another embodiment of the invention wherein a compound lens of a glass lens $L_6$ and a styrene lens $L_7$ bonded together which is arranged in a variator lens group 2 takes advantage of its equivalent $V_T$ to correct the shifting of an image forming plane due to an acryl lens $L_5$ in the same lens group.

Figure 11:
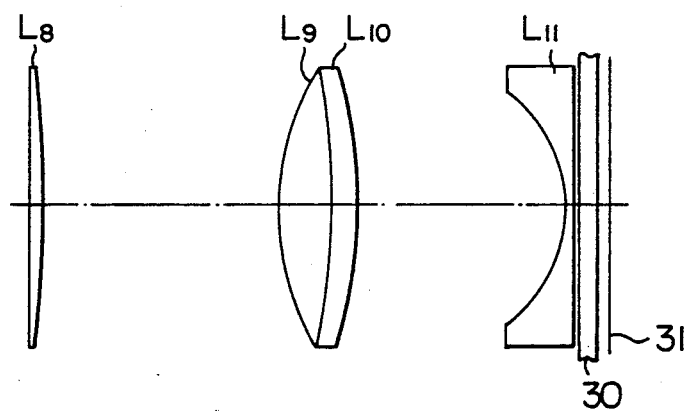

Although in the foregoing embodiments a single compound lens according to teachings of the invention is arranged in one lens group of the zoom lens, a plurality of compound lenses may be used in combination in one zoom lens for the sake of correcting the temperature change dependent shifting. Further, temperature change dependent deformation of all the plastic lenses in one lens system may be corrected by a single compound lens. Still another embodiment as shown in FIG. 11 is directed to this end and applicable to correction of the temperature change dependent shifting in a projection lens for a projection type large size television. More particularly, a compound lens of an acryl lens $L_9$ and a glass lens $L_{10}$ cemented or bonded together takes advantage of its equivalent $V_T$ to correct shifting of an image forming plane due to temperature change dependent deformation and optical characteristic changes of an acryl lens $L_8$ and a styrene lens $L_{11}$. In FIG. 11, a television picture displayed on a fluorescent screen 31 is projected on a lefthand large size screen (not shown) through a faceplate 30 of a television CRT, and lenses $L_{11}$, $L_{10}$, $L_9$ and $L_8$. Thus, the compound lens of the present invention may be applicable also, in addition to the zoom lens, to lenses for a still camera, a cinecamera and a copier.

The invention is also effective to correct the temperature change dependent shifting in a lens system with plastic lenses, without affecting the purpose of design of the plastic lenses. More particularly, one glass lens, for example, in the designed lens system is replaced with a compound lens of a plastic lens and a glass lens according to the invention and power proportion of both the lenses is determined pursuant to the computation formulae described previously. By this, it is possible to correct shifting of an image forming plane due to temperature change dependent deformation and optical characteristic changes of the plastic lenses, while maintaining optical characteristic intended by the design.

We claim:
1. A lens system constructed by a combination of a plurality of lenses comprising:
   at least one plastic lens to be corrected the focal length of which is variable in accordance with ambient temperature changes; and
   a compound lens consisting of a plastic lens and a glass lens opposed to each other, opposed surfaces of the plastic lens and the glass lens of said com- pound lens having substantially the same radius of curvature, the plastic lens and the glass lens of said compound lens being cooperative to function as an equivalent single lens, and the plastic lens of said compound lens having such power as to correct shifting of an image forming plane of the lens system caused by temperature change dependent changes of said at least one plastic lens to be corrected.

2. A lens system according to claim 1 wherein said plastic lens and glass lens of said compound lens are cemented together.

3. A lens system according to claim 1 wherein said plastic lens and glass lens of said compound lens are spaced apart with a gap between opposing surfaces thereof of the same radius of curvature.

4. A lens system according to claim 1 wherein the difference in refractive index between said plastic lens and glass lens of said compound lens is less than approximately 0.3 in absolute value.

5. A zoom lens with plastic lenses comprising:
a front lens group, variator lens group, a compensator lens group, and a master lens group; one of said lens groups including at least one plastic lens to be corrected, at least one of said lens groups including a compound lens of a plastic lens and a glass lens which are opposed to each other, opposed surfaces of the plastic lens and the glass lens of said compound lens having substantially the same radius of curvature, the plastic lens and the glass lens of said compound lens being cooperative to function as an equivalent single lens, and the plastic lens of said compound lens having such power as to correct shifting of an image forming plane of the zoom lens caused by temperature change dependent changes of said at least one plastic lens to be corrected.

6. A zoom lens according to claim 5 wherein said master lens group includes said compound lens.

7. A zoom lens according to claim 5 wherein said front lens group includes said compound lens.

8. A zoom lens according to claim 5 wherein said variator lens group includes said compound lens.

9. A zoom lens according to claim 5 wherein said compound lens and said at least one plastic lens to be corrected are included in the same lens group.

* * * * *